United States Patent Office 3,206,451
Patented Sept. 14, 1965

3,206,451
WATER-SOLUBLE REACTIVE DYES
Jakob Benz, Oberwil, Switzerland, Kurt Brenneisen, Grenzach, Germany, and August Schweizer, Muttenz, and Walter Wehrli, Riehen, Switzerland, assignors to Sandoz Ltd., Basel, Switzerland
No Drawing. Filed Nov. 27, 1962, Ser. No. 240,446
Claims priority, application Switzerland, Dec. 1, 1961, 13,990/61; Dec. 7, 1961, 14,195/61; Sept. 3, 1962, 10,482/62; Sept. 7, 1962, 10,617/62
12 Claims. (Cl. 260—153)

The present invention relates to water-soluble reactive dyes of the formula

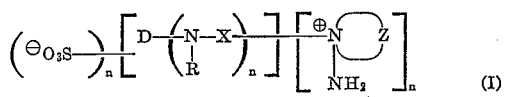
(I)

wherein
D represents the radical of a dye which may contain water-solubilizing groups, preferably that of a metal-free, metallizable or metal-containing dye of the monoazo or diazo series, or of an anthraquinone or a phthalocyanine dye,
R represents hydrogen or optionally substituted alkyl,
X represents a substituted heterocyclic bridge member of the 1,3-diazine or 1,3,5-triazine series,
Z represents a saturated aliphatic chain having 4 to 7 carbon atoms, and
$n$ represents one of the integers 1 and 2.

The preferred dyes of Formula I are those which beside $n$ $SO_3^\ominus$ groups bear 1 to 4 additional water-solubilizing groups such as —$SO_3H$ or —$SO_2$—$NH_2$. These water-solubilizing groups may be bound to the chromophore radical D or to the radical X, e.g. when X is a triazinyl radical bearing in the 6 position an amino group substituted by a sulfophenyl or disulfophenyl group.

The process for the production of the new dyes comprises reacting 1 mole of a compound of the formula

(II)

wherein $D_1$ represents the radical of a dye which may contain water-solubilizing groups or of a compound which is convertible into a dye, and, when $D_1$ stands for the radical of a dye, the radical

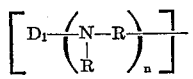

must contain at least $n$ sulfonic acid groups and at least one additional water-solubilizing group, with at least $n$ moles of a compound of the formula

(III)

and when $D_1$ stands for the radical of a compound capable of formation of a dye, transforming the reaction product into a dye by condensation, preferably azo coupling.

Of the compounds of Formula III the following may be specially named: N-aminotetramethylene-imine, N-aminopentamethylene-imine (N-aminopiperidine), N-aminohexamethylene-imine and N-aminoheptamethylene-imine. Especially interesting is N-aminotetramethylene-imine or N-aminopyrrolidine.

The substituent R is preferably a hydrogen atom or a low-molecular alkyl with 1 to about 5 carbon atoms (methyl, ethyl), a low-molecular hydroxyalkyl, (2-hydroxyethyl, 2- or 3-hydroxypropyl), a low-molecular alkoxyalkyl (2-methoxyethyl, 2-ethoxyethyl, 3-methoxypropyl, 3- or 4-methoxybutyl), a low-molecular halogenoalkyl (2-chloroethyl) or a phenylalkyl, e.g. benzyl.

The radical -X-halogen in Formula II is a halogenopyrimidyl radical or a 4-halogeno-1,3,5-triazinyl-2 radical substituted in the 6 position. The preferred halogenopyrimidyl radicals are dichloro-, trichloro-, dibromo- or tribromo-pyrimidyl radicals, e.g. the radicals, which remain after reaction of a chlorine or bromine atom with an exchangeable hydrogen atom, of the following polyhalogenopyrimidines: 2,4,6-trichloropyrimidine, 2,4,6-tribromopyrimidine, 2,4,5,6-tetrachloro- or -tetrabromopyramidine, 2,4,6-trichloro-5-bromopyrimidine, and the radicals 2,4-dihalogeno-6-methylpyrimidyl - 5 - methylene and 2,4-dihalogenopyrimidyl-5-methylene formed from 2,4-dichloro-5-chloromethyl-6-methylpyrimidine or 2,4-dichloro-5-chloromethyl-pyrimidine or from the analogous bromine derivatives.

The preferred 4-halogeno-1,3,5-triazinyl-2 radicals substituted in the 6-position are radicals of the formula

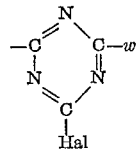

wherein Hal represents chlorine or bromine, and $w$ represents the radical, which may be further substituted, of a primary or secondary aliphatic, alicyclic, aromatic or heterocyclic amine, an aliphatic, alicyclic, aromatic or heterocyclic hydroxy or thiol compound, in particular the radical of aniline, of its alkyl, sulfonic acid or carboxylic acid derivatives, of low molecular monoalkylamines or dialkylamines, or the radical of ammonia.

Water-soluble dyes or intermediates with a halogenopyrimidyl radical which can be used as starting products of general Formula II for the reaction of this invention are described, for example, in the following patents: French Patent 1,221,621 (dichloro- and dibromo-pyrimidylamino radicals), Belgian Patent 578,742 (trichloro- and tribromo-pyrimidylamino radicals), Belgian Patent 589,972 (2,4-dichloro- and 2,4-dibromo-6-methylpyrimidyl-5-methyleneamino radicals).

Water-soluble dyes or intermediates with a substituted halogenotriazinyl radical which can be used as starting products of general Formula II for the reaction of the invention are described, for example, in the following patents: Belgian Patents 559,944, 559,945, 560,734, 560,791, 560,792, 560,793, 560,794, 560,795, 563,864.

The reaction of the compounds of Formula II with the compounds of Formula III is conducted in such a manner that an addition takes place with simultaneous quaternation without cleavage of a proton. It can be carried out in aqueous or aqueous-organic, neutral to alkaline solution or suspension, e.g. in the pH-range 7 to 11. The reaction temperatures can be low to moderately high, e.g. between 0° and 60°. In many cases an addition of a salt of low to medium basicity, e.g. sodium or potassium carbonate, sodium or potassium bicarbonate, disodium or trisodium phosphate, dipotassium or tripotassium phosphate, is of advantage.

A preferred mode of operation of the process consists in the use of excess of the compound of basic reaction of Formula III. In certain cases, e.g. in the quaternation of the readily oxidizable reactive coupling components of the 1,8-amino-hydroxy-naphthalene series, it is advisable to conduct the reaction in the absence of atmospheric oxygen, for example in a nitrogen atmosphere, in order to obviate the use of an unduly large excess of the compound of Formula III.

The reaction time is dependent upon the constitution of the compound of Formula II, the amount of the compound of Formula III, the reaction temperature, the pH value, and the degree of dilution. The time may vary within wide limits, for example from a few minutes to several hours. It can be reduced by increasing the reaction temperature and/or the pH value.

After the reaction the reaction products are precipitated from the weakly alkaline, neutral or, preferably, weakly acid solution, e.g. by the addition of water-miscible organic solvents and/or the alkali metal salts of hydrochloric or sulfuric acid, and filtered off. If necessary the isolated reaction products can be purified by redissolution e.g. in water and reprecipitation from the solution.

When the compounds of Formula II which are reacted with a compound of Formula III are dye intermediates, the reaction products are transformed into dyes by one of the known methods. For example, if the reaction products contain diazotizable amino groups, they can be diazotized and coupled with coupling components. Reaction products which contain groupings capable of coupling can be converted with diazo compounds into azo dyes. These coupling reactions are carried out in a weakly acid, neutral or weakly alkaline aqueous medium. Products obtained by reaction of a compound of Formula III, with a compound of Formula II, which contains a free amino group, can be converted into dyes by reaction with the acid chlorides of dyes, e.g. the polysulfonic acid chlorides of phthalocyanines.

The dyes obtained in accordance with the process can be dried at 40–100° C. with vacuum. They possess a remarkable stability in neutral or acid mediums.

In the process of the present invention dyes or dye intermediates possessing mobile halogen atoms are treated under relatively mild conditions with compounds of Formula III. The distinctive feature of the process is that the compounds obtained as reaction products are much more highly reactive than the corresponding starting products. This is evident in the fact that analogous, known reactive dyes having mobile halogen atoms, upon reaction with compounds of Formula III, can be fixed on textile fibers, notably cellulose, under milder conditions than those normally necessary.

From the difference in the reactivity of the starting products and the final dyes it appears certain that the final products have the constitution of acylhydrazonium compounds:

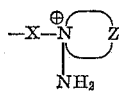

The central nitrogen atom in these compounds is bound through covalent linkages to three carbon atoms and one nitrogen atom. Owing to their ion-pair structure, they exhibit salt-like character. To this cation corresponds as anion an $SO_3^{\ominus}$ group, to form an inner-molecular compound, the molecule of which has the configuration of a betaine. Similarly to the acylammonium compounds, acylhydrazonium compounds of this type are excellent acylating agents.

It was conceivable that the starting products would have reacted to yield acylated hydrazines:

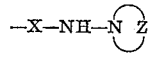

with cleavage of a proton from

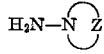

In contrast to the acylhydrazonium compounds these compounds do not contain a quadruply bound nitrogen atom.

The reaction of acyl halides with hydrazine and substituted hydrazines, e.g. methylhydrazine and phenylhydrazine, to the corresponding acylated derivatives is known. These acylhydrazines are characterized by having substantially lower reactivity than the halogen compounds used in their synthesis. Unlike quaternary acylhydrazonium compounds, they are not generally suitable for use as acylating agents owing to this low reactivity. For the synthesis of acylated hydrazines it is preferable to apply considerably more vigorous reaction conditions than those used for quaternation of the same halogen compounds with the compounds of Formula III.

The constitution of acylated hydrazines cannot, therefore, be attributed to the products obtained in accordance with the invention. This is surprising, especially in view of the steric structure of the compounds of Formula III.

The quaternation of starting dyes conforming to the present definition is also known. In Textil-Praxis 15, 831 (1960) Wegmann describes a pyridinium salt, which "does not lead to a more rapid reaction." It is therefore surprising that the hydrazonium dyes of the invention should be of higher reactivity than the starting compounds.

The dyes obtained are suitable for dyeing leather, and for dyeing, padding and printing fibers of animal origin, e.g. wool, silk; synthetic polyamide fibers, e.g. nylon; cellulosic fibers, e.g. cotton, linen; regenerated cellulosic fibers, e.g. viscose rayon, cuprammonium rayon; and mixtures and other articles of these fibers. The optimum conditions of application are governed by the type of fiber and the dyes used.

The dyeing, padding, printing or fixation of the dyes on cellulosic fibers is carried out to best advantage in a neutral to alkaline medium, e.g. in the presence of sodium bicarbonate, sodium carbonate, trisodium phosphate, ammonia, etc. The usual dispersing, emulsifying, thickening agents and other textile or leather chemicals can be used as required.

In comparison with the halogenopyrimidyl and halogenotriazinyl dyes used as starting products, the dyes of the invention have the great advantage that they react with the textile fiber much more easily and rapidly. Fixation on cotton, for example, can be effected at room temperature instead of 90–100° C., and in the pad-batch process the storage times and/or the amount of alkali or the alkalinity can be reduced.

The dyeings and prints on cellulosic fibers have good light fastness and outstanding wet fastness properties (fastness to washing, water, water-spotting, perspiration, rubbing, sublimation, ironing, dry cleaning or organic solvents). These are due to the formation of a stable chemical linkage between the dye molecule and the cellulose molecule. The total amount of dye applied does not always react with the fiber. In these cases the portion of unreacted dye is removed from the fiber by suitable treatment, e.g. rinsing and/or soaping, if necessary at higher temperatures, for which purpose synthetic detergents can be used, e.g. alkylaryl sulfonates (dodecylbenzenesulfonate), sodium alkylsulfates (sodium lauryl sulfate), alkylpolyglycol ethers, mono- and di-alkyl-phenyl-polyglycol ethers, which may be sulfated or carboxymethylated.

The dyeings and prints on wool and synthetic polyamide fibers also possess good fastness to light and excellent wet fastness properties (e.g. fastness to washing, water, water-spotting, milling, perspiration, sublimation, ironing, dry cleaning or organic solvents).

The dyes reserve triacetate rayon, polyester fibers e.g. polyethylene, terephthalate, polyvinyl chloride and polyvinyl acetate fibers, polypropylene and polyethylene fibers.

In the following examples the parts and percentages are by weight and the temperatures in degrees centigrade.

Example 1

75 parts of the dye sodium 1-hydroxy-2-[3'-(2'',5'',6''-trichloropyrimidyl - 4'' - amino)-phenylazo]-naphthalene-4,6,6'-trisulfonate are dissolved in 600 parts of water at 40° and pH 8.0. A solution of 17.2 parts of N-aminopyrrolidine in 50 parts of water, adjusted to pH 8.0, is added with stirring. The mixture is stirred for 20–24 hours at 40° and pH 8.0. On completion of the reaction the solution is adjusted to pH 5–6 with hydrochloric acid and the dye precipitated by the addition of acetone. It is filtered off, and the residue washed with acetone, well pressed and dried at 60° with vacuum. A red powder is obtained which dissolves in water to give scarlet solutions.

A suitable dyeing procedure is as follows. 2.4 parts of the dye obtained as described above and 8 parts of urea are dissolved in 100 parts of water at room temperature. A separate solution of 6 parts of calcined sodium carbonate in 100 parts of water is prepared. During the padding process the two solutions are mixed in a mixing device in the ratio 3:1 and continuously added to the liquor trough according to the rate of consumption. A mercerised cotton fabric is impregnated with this solution at room temperature, squeezed to retain 70% of its weight of liquor, rolled up and the roll wrapped in an airtight sheet of plastic to prevent drying. After storage for 6 hours at room temperature the fabric is rinsed in cold and hot water, treated for 10 minutes at the boil with a 0.3% solution of a non-ionic detergent, rinsed again and dried. In this way a brilliant scarlet dyeing is obtained which has outstandingly good wet fastness properties and very good light fastness.

Example 2

75 parts of the dye sodium 1-(2'',5'',6''-trichloro-pyrimidylamino) - 7 - phenylazo-8-hydroxyazonaphthalene-2',3,6-trisulfonate are suspended in 900 parts of water at 20° and pH 8.0. A solution of 17.2 parts of N-aminopyrrolidine in 50 parts of water, adjusted to pH 8.0, is added with stirring, upon which the dye goes into solution. Stirring is continued for 24–30 hours at room temperature and pH 8.0, then the solution is made weakly acid and the reacted dye precipitated by the addition of alcohol. The precipitate is filtered off, washed with alcohol and pressed well. On drying at 60° with vacuum, a dark red powder is obtained which dissolves in water with a blue-red coloration.

15 parts of this dye are dissolved in 1000 parts of water. The solution is padded on a fabric of mercerised cotton, which is then squeezed to contain 90% of its weight of the solution and dried at room temperature. This is followed by treatment for 10 minutes in 1000 parts of an aqueous solution at 25° containing 5 parts of sodium carbonate and 300 parts of sodium sulfate, cold and warm rinsing, soaping at the boil for 15 minutes, rinsing, and drying. A bluish red dyeing with excellent wet fastness properties is obtained.

Example 3

71.6 parts of the dye sodium 2-hydroxy-1-(3'-dichloropyrimidylamino) - phenylazonaphthalene - 6,6',8 - trisulfonate, produced from sodium 2-hydroxy-1-(3'-aminophenylazo)-naphthalene-6,6',8-trisulfonate and 2,4,6-trichloropyrimidine, are dissolved in 750 parts of water at 40° and pH 7.5–8.0. A solution of 12.5 parts of N-aminopyrrolidine in 50 parts of water, adjusted to pH 8, is added and the mixture stirred for several hours at a constant pH value of 7.5–8.5, obtained by the addition of 10% sodium carbonate solution. On completion of the reaction the mass is made weakly acid and the dye precipitated with sodium chloride. It is filtered off cold, washed with an aqueous sodium chloride solution, and dried at 40° with vacuum. On grinding it is obtained as an orange-red powder which dissolves in water to give yellow-orange solutions.

Mercerized, bleached cotton fabric is padded with a solution of 2% of this dye, 1% of sodium sulfate and 0.3% of sodium carbonate at room temperature, squeezed to retain 70% of its weight of the solution, rolled up and wrapped in an airtight sheet of plastic to prevent drying. The dye solution and the solution of sodium carbonate and sodium sulfate are prepared separately and mixed immediately before padding, preferably by means of an automatic mixing device. After storage for 6 hours at 20–30°, the dyed goods are rinsed cold and hot, soaped at the boil for 20 minutes with a solution of 2 parts of a non-ionic detergent in 1000 parts of water, rinsed and dried. A brilliant orange dyeing fast to washing and water is obtained.

Example 4

37 parts of 1-amino-3-[2',5',6'-trichloropyrimidyl-(4')-amido]-benzene-6-sulfonic acid are dissolved in 550 parts of water at 50° with the addition of sodium hydroxide solution. The solution is cooled to 20°. 10 parts of N-aminopyrrolidine are added with stirring, upon which the solution becomes strongly alkaline. It is stirred at 20–25°, during which the pH value slowly decreases and is maintained at pH 8.3–8.5 with 10% sodium carbonate solution. The reaction product begins to be precipitated in colorless crystalline form. Further 10% sodium carbonate solution is added until the pH value no longer changes significantly; for this several hours are necessary. The suspension is stirred at room temperature overnight and the precipitated reaction product then filtered off. By washing with dilute common salt solution the filter cake is largely freed of the adsorbed filtrate.

The moist filter cake is stirred in 1200 parts of water at 30°. 30 parts of 30% hydrochloric acid are added and sufficient ice to cool to 10°. A dilute solution of 4 parts of sodium nitrite is added. The resulting solution of the diazo compound is of greenish yellow color. On completion of diazotization the excess nitrous acid is destroyed by the addition of some aminosulfonic acid.

To the solution of the diazo compound is added 18.8 parts of 1-phenyl-3-methyl-5-pyrazolone-2',5'-disulfonic acid. The coupling solution is then neutralized by the addition in portions of sodium carbonate. On completion of coupling the golden-yellow dye solution is weakly acidified with dilute acetic acid, heated to 40°, and the dye precipitated with sodium chloride. It is filtered off and washed with dilute sodium chloride solution. The moist filter cake is dried at 80° with vacuum and then ground to give a yellow powder which dissolves in water and in concentrated sulfuric acid with a yellow coloration.

When the 18.8 parts of 1-phenyl-3-methyl-5-pyrazolone-2',5'-disulfonic acid used in the above example are replaced by 18.2 parts of 1-(2',5'-dichlorophenyl)-3-methyl-5-pyrazolone-4'-sulfonic acid, a dye of the same shade and similar properties but of slightly lower solubility is obtained.

30 parts of the dye obtained according to the procedure described above are dissolved in 300 parts of water at room temperature. 100 parts of urea are added to the solution, which is then stirred into 450 parts of 4% sodium alginate thickening. 10 parts of sodium bicarbonate and 10 parts of sodium 3-nitrobenzene-sulfonate are added, the whole is vigorously stirred and made up to a total weight of 1000 parts with cold water.

A mercerized cotton fabric is printed with this paste, dried at room temperature, steamed for 30 seconds at 102° in a rapid ager, rinsed in cold water, soaped at the boil, rinsed again in cold water, and dried. A brilliant greenish yellow print of outstanding light fastness and excellent wet fastness is obtained.

*Example 5*

61.7 parts of the dye of the formula

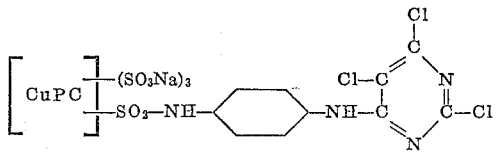

produced according to the particulars of Example 5 of Belgian Patent 578,742, in which the —SO₃Na— group and the —SO₂—NH— group occupy the positions 3, 3′, 3″, 3‴ of the phthalocyanine molecule, are dissolved in 650 parts of water at 40°. To this solution is added with stirring a solution adjacent to pH 8.5 of 9.5 parts of N-aminohoptamethyleneimine in 100 parts of water. The reaction mass is stirred for several hours at about 40° and at a constant pH of 8 to 8.5 obtained by the addition of a 20% sodium carbonate solution. On completion of the reaction the mass is made weakly acid and the dye salted out with sodium chloride. It is filtered off at room temperature, washed with an aqueous sodium chloride solution and dried at 60–80° with vacuum. A dark blue powder is obtained which dissolves in water with a bright blue coloration and gives brilliant turquoise dyeings and prints of excellent wet fastness on cellulosic fibers.

Equally good results are obtained with the dyes Nos. 11 and 190 to 194 of Belgian Patent 578,742, with dyes Nos. 2, 11 and 190 to 194 of French Patent 1,221,621, and with the dye described in the last paragraph of Example 10 of Belgian Patent 589,972 and the dyes Nos. 93 to 97 of the last named patent.

*Example 6*

85 parts of the dye sodium 1-hydroxy-2-(4′-methoxyphenylazo) - 6-[N - methyl - N - 6″-methoxy-4″-chloro-1″,3″,5″-tryazinyl-(2″)-amino]-naphthalene - 3,2′ - disulfonate, synthesized in the normal way, are dissolved in 1700 parts of water at 20° and pH 7.5. To this solution is added with stirring a solution of 15 parts of N-amino pyrrolidine in 100 parts of water. This causes the pH value to rise by about two units, but on continued stirring it falls again to some extent. Stirring is continued at room temperature until the pH value remains practically constant. The reaction mass is acidified with dilute hydrochloric acid, and the dye precipitated by the addition of sodium chloride and filtered off. The filter cake is washed with dilute sodium chloride solution, pressed well and dried with vacuum at 60–80°. A red powder is obtained which dissolves in water to give scarlet solutions.

20 parts of the dye obtained by the above route are dissolved in 1000 parts of water. With this solution a mercerized cotton fabric is padded, and subsequently squeezed to retain 90% of its weight of the solution. While still moist it is treated at 25° for 30 minutes in a bath containing 150 parts of calcined sodium sulfate and 2 parts of calcined sodium carbonate dissolved in 1000 parts of water. The dyeing is finished in the normal way. A brilliant scarlet dyeing with excellent wet fastness properties and good light fastness is obtained.

*Example 7*

134 parts of the trisodium salt of the secondary condensation product of 1-(4′,6′-dichloro-1′,3′,5′-triazinyl-2′-amino)-8-hydroxynaphthalene-3,6-disulfonic acid and 1-aminobenzene-4-sulfonic acid are suspended in 1900 parts of water at 20°. To the suspension is added with stirring 30 parts of N-aminopiperidine. On this addition the pH value rises at first, but stirring is continued for several hours and during this time the pH value falls to a certain degree and is maintained at 7.5–8.5 by dropwise addition of sodium carbonate solution. Subsequently, the reaction product is precipitated with acetone, filtered off, washed with acetone and well pressed.

Meantime 35 parts of 1-aminobenzene-2-sulfonic acid are diazotized in the usual way. The presscake is added with stirring to the suspension of the diazo compound to 0–5° and coupling completed at 5–15° and a pH value of 4–5. The resulting red dye is precipitated with sodium chloride or acetone and filtered off, the filter cake washed with dilute sodium chloride solution or acetone, well pressed and dried with vacuum at 60–80°. A brown powder is obtained which dissolves in water with a blue-red coloration.

It is possible to arrive at the same dye by first reacting diazotized 1-aminobenzene-2-sulfonic acid with the above-named coupling component and treating the resulting monochlorotriazinyl dye with N-aminopiperidine.

On application to a fabric of cellulosic fiber and fixation in an alkaline medium, a bluish red dyeing with excellent wet fastness properties is obtained.

*Example 8*

87.3 parts of the dye of the formula

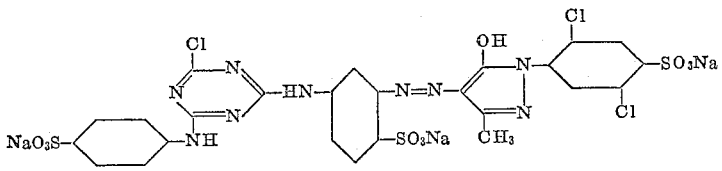

are added with stirring to 650 parts of water at 20° and pH 8, upon which the greater part of the dye goes into solution. A solution of 12.5 parts of N-aminopyrrolidine in 50 parts of water, adjusted to pH 8, is added to form a turbid solution. This is stirred for several hours, then rendered weakly acid. 210 parts of potassium chloride are added and the precipitated dye filtered off. The filter cake is washed with saturated potassium chloride solution, pressed well and dried with vacuum at 50–60°. A yellow powder is obtained which dissolves in water to give greenish yellow solutions.

30 parts of the dye described above are dissolved in 300 parts of water at room temperature, and 100 parts of urea added to the solution. This solution is stirred into 450 parts of 4% sodium alginate thickening, 10 parts of sodium bicarbonate and 10 parts of sodium 3-nitrobenzenesulfonate are added. Finally, cold water is added with stirring to give a total of 1000 parts by weight.

A mercerized cotton fabric is printed with this paste, dried at room temperature and steamed for 30 seconds at 102° in a rapid ager. The fabric is rinsed in cold water, soaped at the boil, rinsed again in cold water, and dried. A brilliant greenish yellow print with excellent light and wet fastness properties is obtained.

*Example 9*

72 parts of the monoazo dye 1-(4″-chloro-6″-N-methyl-N-phenyl-amino - 1″,3″,5″-triazinyl-2″)-amino-7-phenylazo-8-hydroxynaphthalene - 2′,3,6-trisulfonic acid are dissolved in 800 parts of water at room temperature and the necessary amount of 30% sodium hydroxide solution. After the addition of 14 parts of N-aminohexamethyleneimine the reaction solution is stirred for about 5 hours at 25–30° and the pH value of the solution held at 8.5–9.0 by adding aqueous sodium carbonate solution as required. On completion of quaternation the reaction product is precipitated by the addition of sodium chloride, filtered off and washed with aqueous sodium chloride solution. On drying at 40° under reduced pressure and subsequent grinding, a red-brown powder is obtained which dissolves in water to give red solutions.

100 parts of mercerized cotton fabric are dyed in a winch containing 3000 parts of a dyebath prepared as follows. 1.5 parts of the dye synthesized by the above-described procedure are dissolved in 100 parts of soft water at 25° and added to the dyebath which already contains 180 parts of calcined Glauber's salt. The temperature of the dyebath is 20–25°. The goods are entered and worked about in the dyebath for 30 minutes at room temperature. After the addition of 15 parts of calcined sodium carbonate the fabric is dyed further for 1 hour at room temperature. The dyebath is then run off and the dyed goods rinsed in cold and hot water, soaped at the boil for 20 minutes with a 0.1% solution of a non-ionic detergent, rinsed and dried. A brilliant bluish-red dyeing with very good wet fastness properties and good light fastness is obtained.

*Example 10*

134 parts of the normally produced 2:1 cobalt complex compound of the monoazo dye sodium 1-phenyl-3-methyl-4-[2″-hydroxy-3″ - (4‴-chloro - 6‴-amino - 1‴,3‴,5‴-triazinyl-2‴-amino)-phenylazo]-5-pyrazolone-4′,5″-disulfonate are dissolved in 600 parts of water at 20°. To the well stirred solution 23 parts of N-aminopyrrolidine are added, on which the pH value rises but then falls again to some extent as stirring is continued. After stirring for about 2½ hours—a part of the dye is precipitated during this time—the volume is increased to 1000 parts with water, the suspension neutralized with dilute acetic acid, and the dye precipitated with 100 parts of common salt and filtered off. The filtercake is washed with dilute common salt solution, pressed well and dried at 60–80° with vacuum. A dark violet-brown powder is obtained which dissolves in water with a yellow-brown coloration.

20 parts of the dye produced by the above procedure are dissolved with 200 parts of urea and 20 parts of sodium carbonate in 760 parts of cold water. With this solution a mercerized cotton fabric is padded and squeezed to retain 90% of its weight of the solution. While still moist it is dried for 2 minutes at 120°, and then soaped, rinsed and finished in the normal way. The brown dyeing has outstanding light fastness and very good wet fastness properties.

When the above dye is replaced by 138 parts of the 2:1 chromium complex compound of sodium 1-hydroxy-2-(2′-hydroxy - 5′-nitrophenylazo)-8-(2″,5″,6″-trichloropyrimidyl - 4″-amino)-naphthalene - 3,6-disulfonate produced according to the particulars of Belgian Patent 589,104, and the reaction time is extended to about 5 hours, a dye is obtained which dissolves in water to give bluish grey solutions and which gives light- and wet-fast dyeings on cotton and regenerated cellulosic fibers when applied by the pad-batch process in the presence of sodium carbonate at room temperature with about 2 hours' storage.

*Example 11*

A solution is prepared with 1400 parts of water and 110 parts of the 1:1 copper complex compound of sodium 1-hydroxy-2-(1′-hydroxy-naphthyl - 2′-azo)-8-(4″-chloro-6″-phenylamino - 1″,3″,5″-triazinyl-2″-amino)-naphthalene-3,6,4′,8′,3‴-pentasulfonate, which is produced by coupling diazotized 2 - aminonaphthalene - 4,8 - disulfonic acid with the secondary condensation product of molecular amounts of cyanuric chloride, 1-amino-8-hydroxy-naphthalene-3,6-disulfonic acid and 1-aminobenzene-3-sulfonic acid and subsequent oxidative coppering. The solution is adjusted to pH 7.5 and then cooled to 0°. A solution of 26 parts of N-aminopyrrolidine in 240 parts of water, previously adjusted to pH 7.5 with dilute hydrochloric acid, is added with stirring. The reaction mixture is stirred for several hours at 0–5°. The solution is then rendered weakly acid with dilute hydrochloric acid, the dye precipitated by the addition of isopropanol, and filtered off. The filtercake is washed with isopropanol, pressed and dried at room temperature. A dark powder is obtained which dissolves in water with a blue coloration.

When this dye is fixed on cotton fabric in a cold alkaline medium by the procedure described in Example 3, a reddish blue dyeing with outstanding wet fastness properties and very good light fastness is obtained.

*Example 12*

21 parts of the dried reaction product of 1-amino-3-[2′,5′,6′-trichloropyrimidyl-(4′) - amino] - benzene-6-sulfonic acid and N-amino-pyrrolidine obtained acording to the procedure of Example 4, are stirred into 1000 parts of water at room temperature, acidified with 30 parts of 30% hydrochloric acid and diazotized with a concentrated aqueous solution of 3.5 parts of sodium nitrite at 10–15°.

The yellow solution of the diazo compound is freed of excess nitrous acid, 30 parts of the dried reaction product of 1 - [2′,5′,6′-trichloropyrimidyl-(4′)-amino]-8-hydroxynaphthalene-3,6-disulfonic acid and N-aminopyrrolidine, prepared as described below, are added in small portions. With good stirring the pH value of the coupling mass is adjusted to 4–4.5 by the addition of crystallized sodium acetate. On completion of the coupling the dye suspension is heated to 50° and after the addition of some sodium chloride solution the dye is filtered off. The moist filtercake is washed with dilute sodium chloride solution and dried at 60° with vacuum. On grinding the dye is obtained as a brown which dissolves in hot water to give red solutions.

When the dye produced as described above is fixed on cotton fabric in alkaline medium, a bluish red dyeing with very good wet fastness properties is obtained.

The reaction product of 1-[2′,5′,6′-trichloropyrimidyl-(4′)-amino]-8-hydroxynaphthalene-3,6-disulfonic acid and N-aminopyrrolidine used above is produced as follows:

250 parts of 1-[2′,5′,6′-trichloropyrimidyl-(4′)-amino]-8-hydroxynaphthalene-3,6-disulfonic acid are stirred into 2000 parts of water and dissolved with dilute sodium hydroxide solution at a pH value of 7.5 A slow jet of nitrogen is conducted through the solution in order to remove the atmospheric oxygen, and 65 parts of N-amino-pyrrolidine are then added with good stirring. The reaction solution is stirred for a few hours at 30–35° in the absence of air. The reaction product is precipitated by the addition of sodium chloride, filtered off, washed well with sodium chloride solution, and dried.

*Example 13*

16.8 parts of the dye sodium 1-amino-4-[3′-(4″-chloro-6″-phenylamino - 1″,3″,5″-triazinyl-2″-amino) - phenylamino] - anthraquinone-2,4′,4‴-trisulfonate, produced in the normal way, are dissolved in 100 parts of water at 20°. 4 parts of N-aminopyrrolidine are added to the solution. The pH value rises immediately but falls slightly on continued stirring. After about 2 hours stirring at room temperature the solution is neutralized, the reacted dye precipitated with acetone and filtered off. The filter cake is washed with acetone, pressed well and dried at 60–80° with vacuum. A dark blue powder is obtained which dissolves in water with reddish blue coloration.

When the treatment of the dye with N-aminopyrrolidine is carried out at 60°, the reaction is already completed after a few minutes.

The dye of this example, applied to a cellulosic fabric and fixed as described in Example 3, gives a reddish blue dyeing of outstanding wet fastness and very good light fastness.

When the dye used in this example is replaced by the equal amount of the dye sodium 1-amino-4-[4′-(4″-chloro-6"-phenylamino-1",3",5" - triazinyl-2"-amino)-phenlyamino] - anthraquinone - 2,3',4'" - trisulfonate, similarly good results are obtained.

Example 14

21.7 parts of 1-amino-2-carboxybenzene-4-sulfonic acid are stirred into 200 parts of water and dissolved by adding dilute sodium hydroxide solution until a neutral reaction is obtained. An aqueous solution of 7 parts of sodium nitrite is added and the cooled mixture is then run into an ice-cooled solution of 30 parts of 30% hydrochloride acid in 100 parts of ice-water. On completion of diazotization the excess nitrous acid is destroyed by the addition of some aminosulfonic acid.

57 parts of the dried reaction product of 1-[2',5',6'-trichloropyrimidyl-(4')-amino]-8 - hydroxynaphthalene-3,6-disulfonic acid annd N-aminopyrrolidine produced according to Example 12, are dissolved in 600 parts of water and the solution cooled to 5°.

After the addition of 15 parts of crystallized sodium acetate the diazo solution is run in at 5–10°. A readily soluble red monoazo dye is formed. It is precipitated by the addition of sodium chloride and acetone, filtered off and washed with aqueous, acetone-containing sodium chloride solution. On drying with vacuum at 60° and grinding, it is obtained as a red-brown powder which dissolves in water with a bluish red coloration.

15 parts of this dye are dissolved in 1000 parts of water and the solution padded on a mercerized cotton fabric. The fabric is squeezed to retain 90% of its weight of solution and dried at room temperature. It is then treated for 10 minutes in 1000 parts of an aqueous solution at 25° containing 5 parts of sodium carbonate and 300 parts of sodium sulfate, rinsed in cold and hot water, soaped for 15 minutes at the boil, rinsed hot and cold, and dried. The red dyeing thus obtained is treated for 20 minutes at 60° in 1000 parts of a solution containing 20 parts of crystallized copper sulfate and 20 parts of 30% acetic acid. After rinsing and drying a bright violet dyeing with excellent wet fastness properties and good light fastness is obtained.

The formulae of the dyes of Examples 1 to 14 are as follows:

*Example 1*

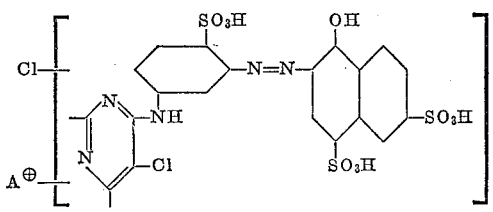

*Example 2*

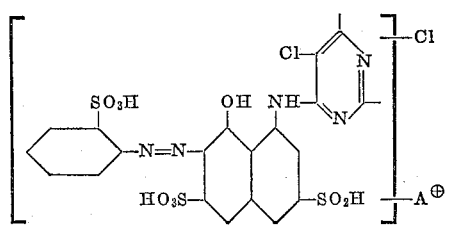

*Example 3*

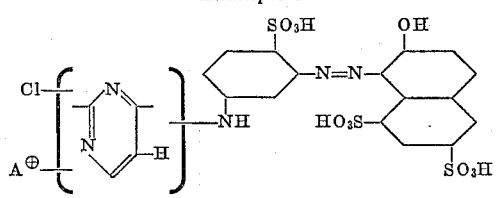

*Example 4*

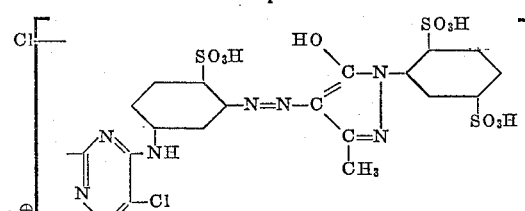

*Example 5*

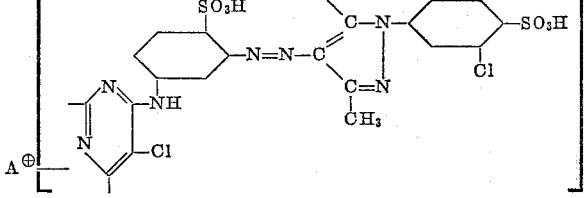

*Example 6*

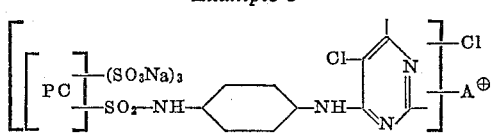

*Example 7*

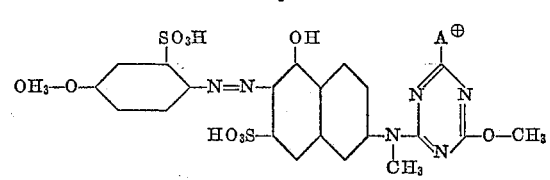

*Example 8*

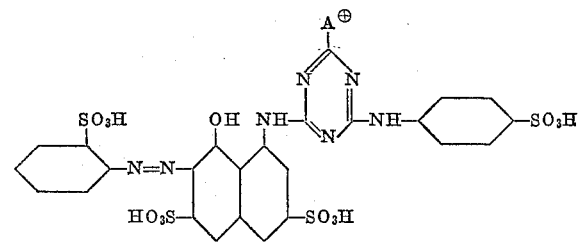

*Example 9*

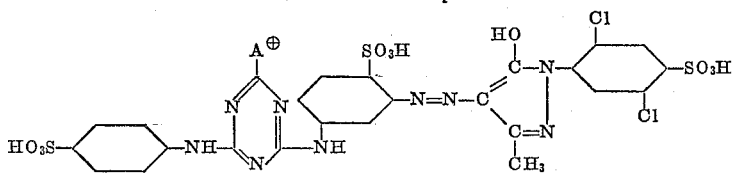

Example 10
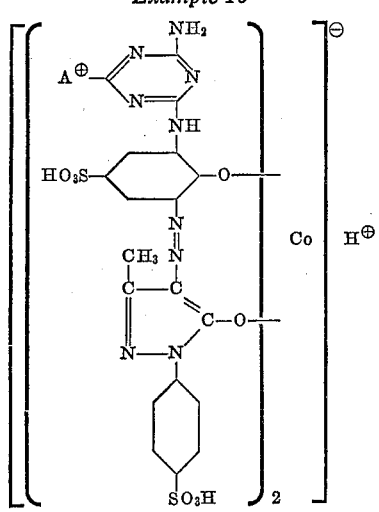
Example 11
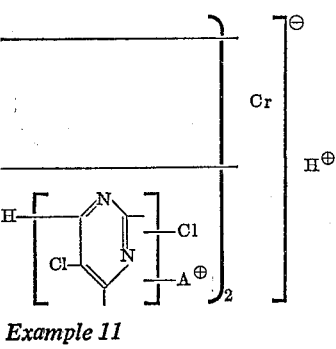
Example 12
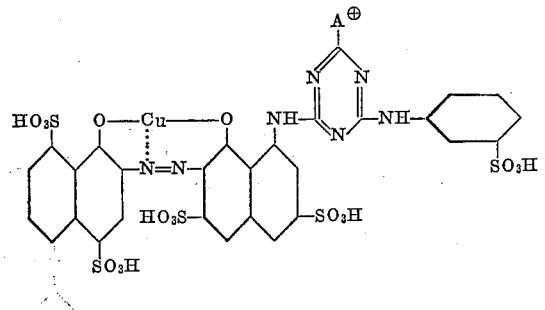
Example 13
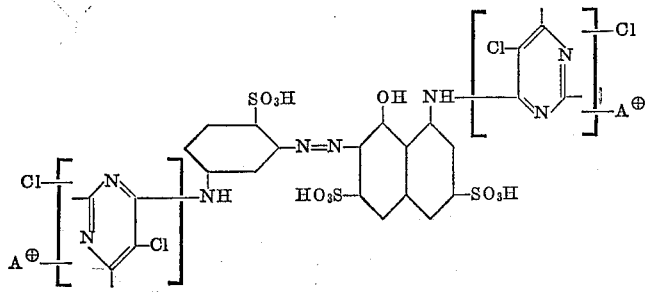
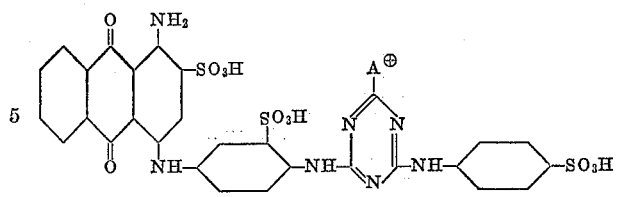
Example 14
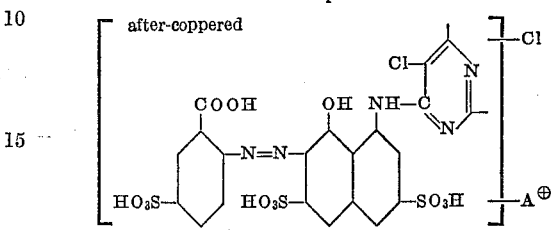
In the foregoing examples the symbol A⊕ represents:
(1) The radical
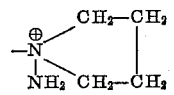
in Examples 1, 2, 3, 4, 6, 8, 10, 11, 12, 13 and 14.
(2) The radical
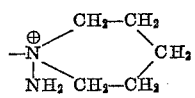
in Example 7.
(3) The radical
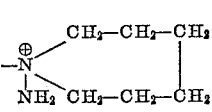
in Example 9.
(4) The radical
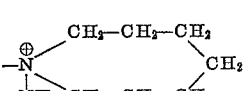
in Example 5.
In Examples 1, 2, 4, 5, 10 (second formula), 12 and 14 the formula
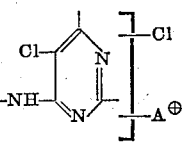
means that the external chlorine atom is bound to one of the two free valences of the heterocyclic nucleus and the cation A⊕ is bound to the other free valence, the dye itself being a mixture of the two isomers.

In Example 3 the formula

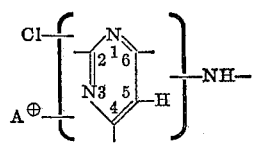

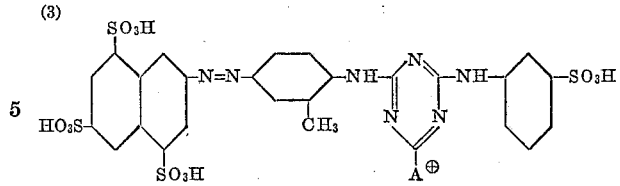

(3)

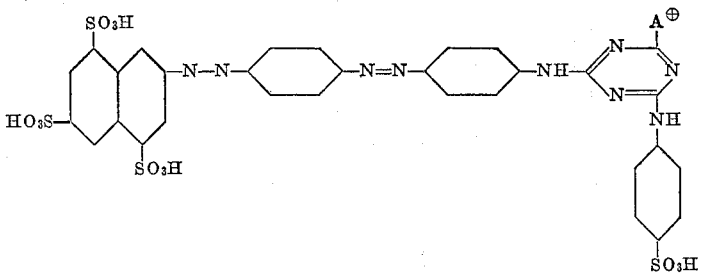

(4)

means the group —NH— is bound to one of the three free valences of the heterocyclic nucleus, the chlorine atom is bound to the second free valence and the cation A⊕ is bound to the third free valence, the dye itself being a mixture of three isomers, since the two positions 4 and 6 are equivalent.

The following table contains further dyes which were obtained by the procedures described in Examples 1 to 14. In the table PC represents the copper phthalocyanine radical and A⊕ represents

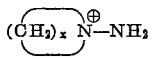

wherein $x$ stands for one of the integers 4, 5, 6 and 7.

This cation has as corresponding anion a sulfonic acid group of the dye molecule. Which sulfonic acid group serves as anion is not known and is not specially indicated here.

(5)

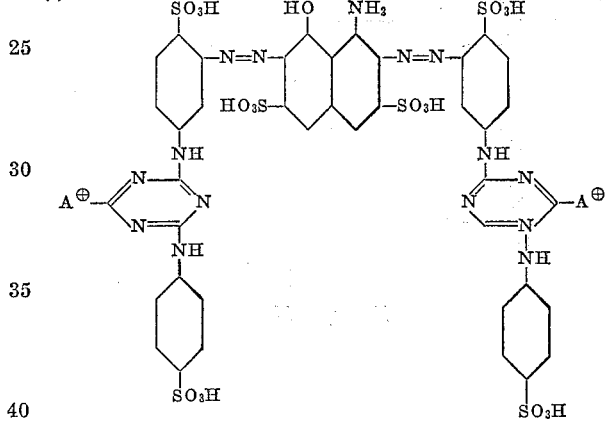

(6)

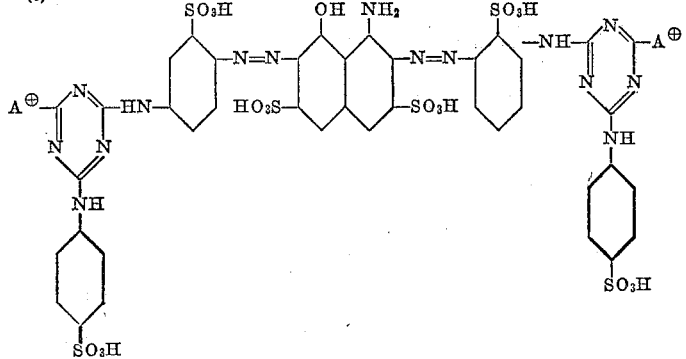

(1)

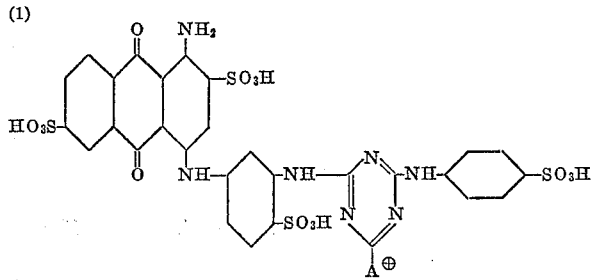

(7)

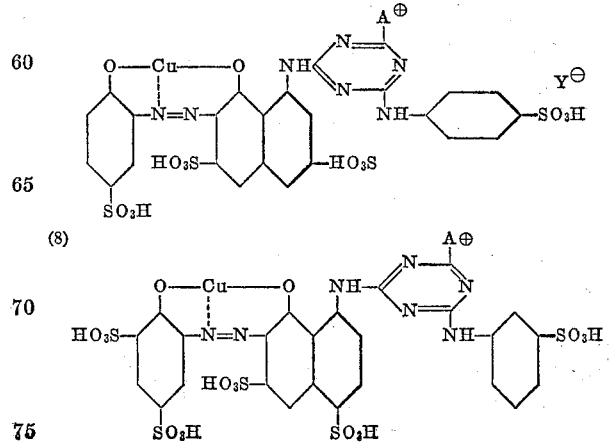

(2)

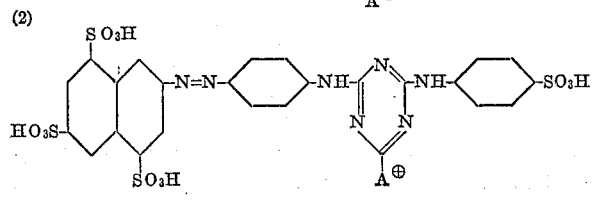

(8)

(9) 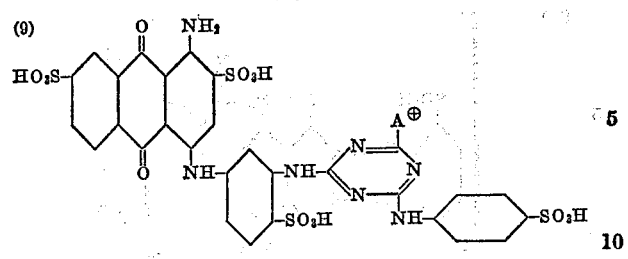
(10) 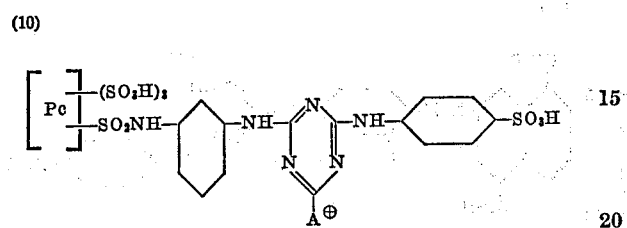
(11) 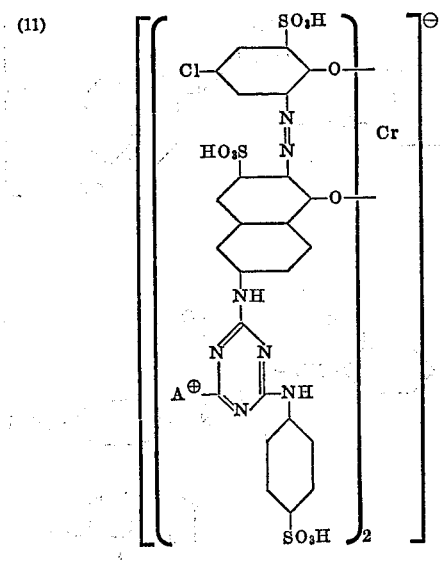
(12) 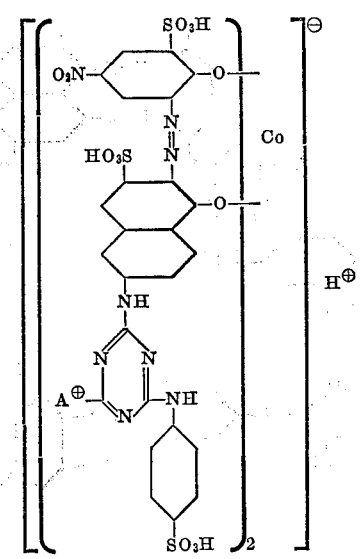
(13) 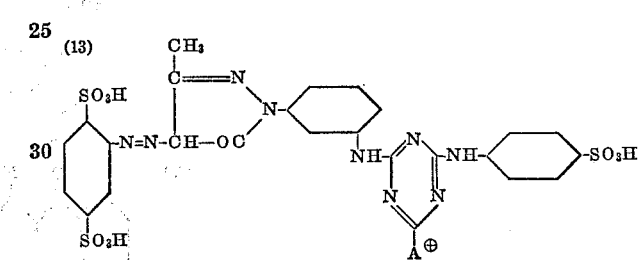
(14) 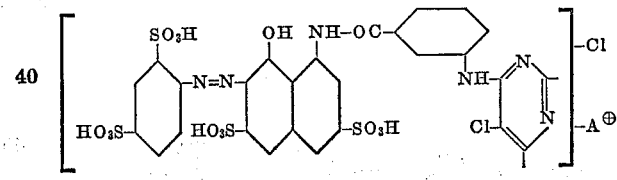
(15) 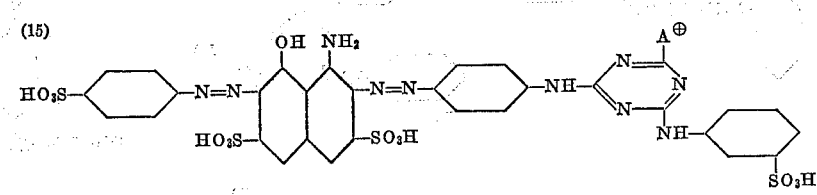
(16) 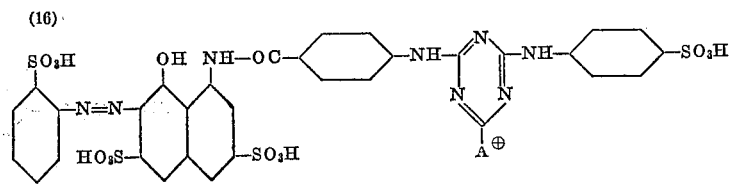
(17) 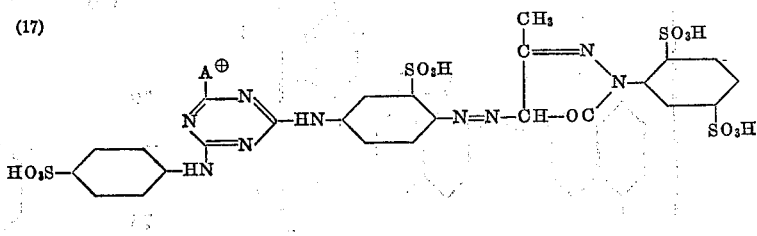

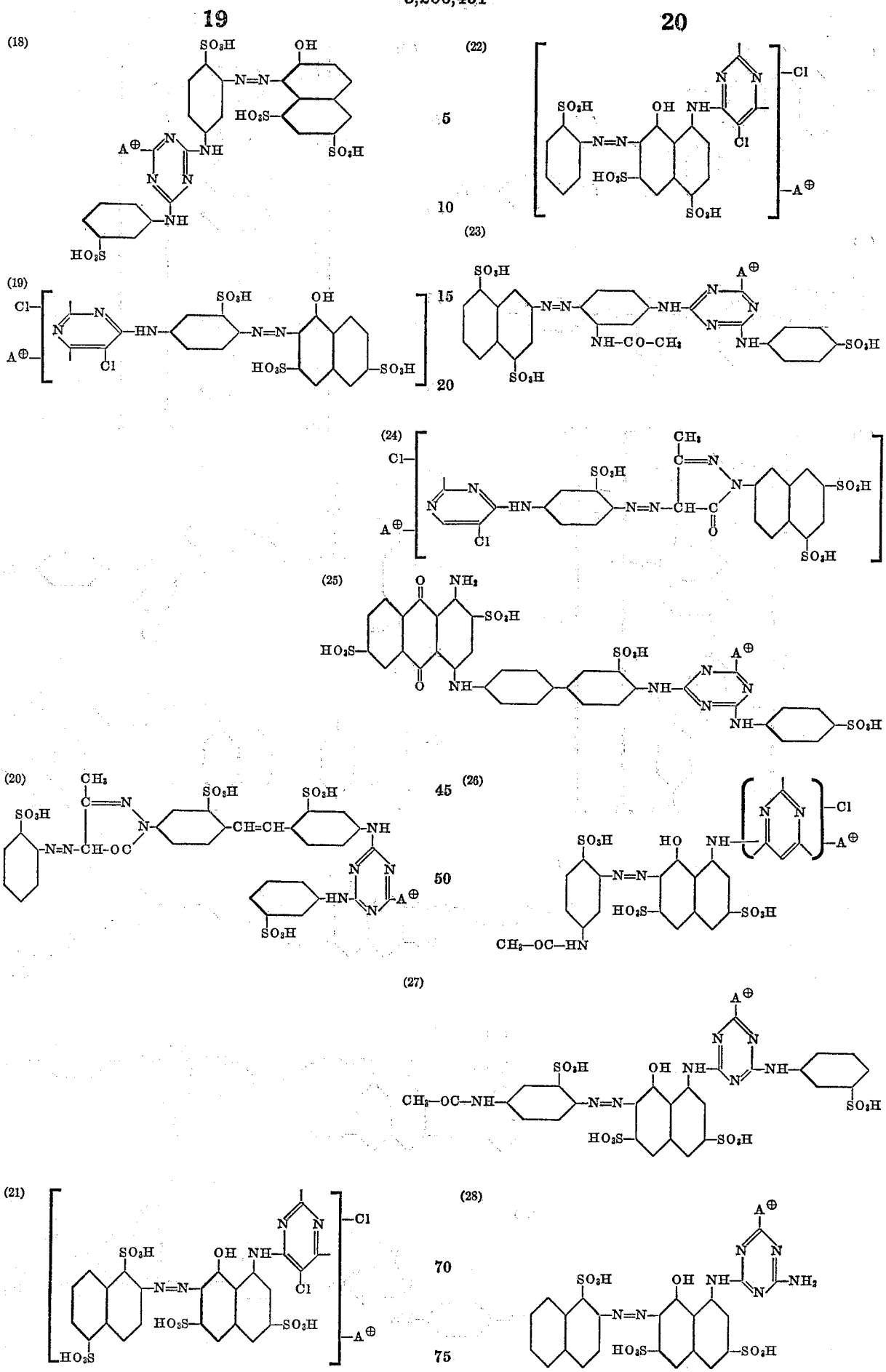

(29) 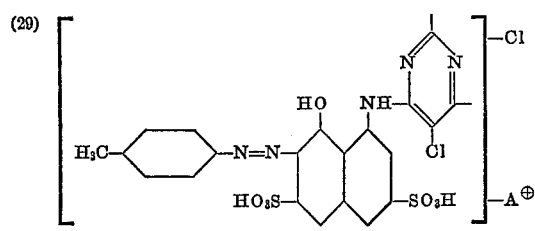
(32) 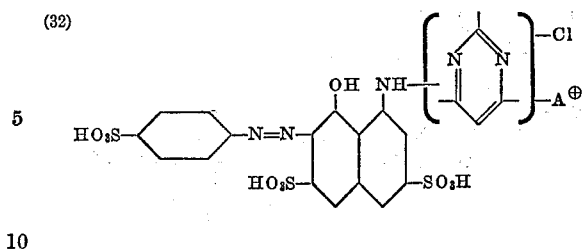
(33) 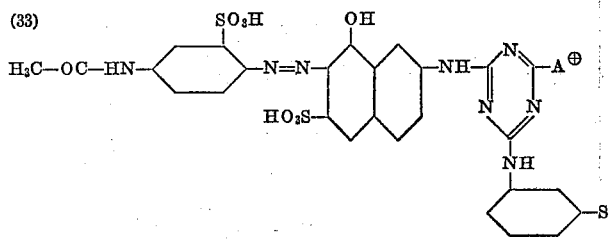
(34) 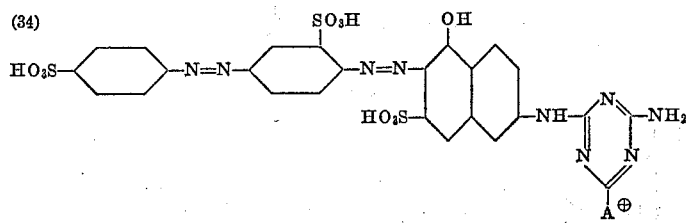
(35) 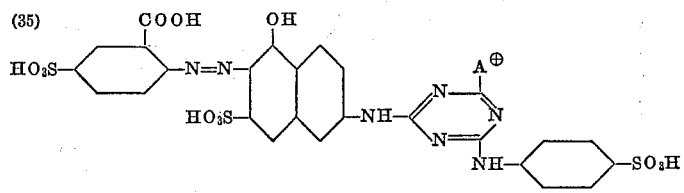
(30) 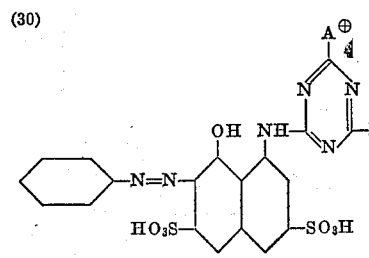
(36) 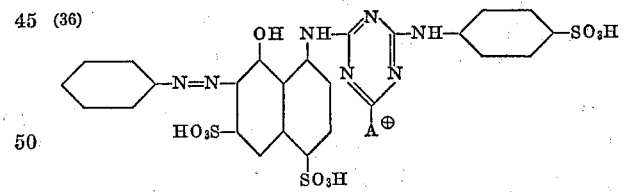
(31) 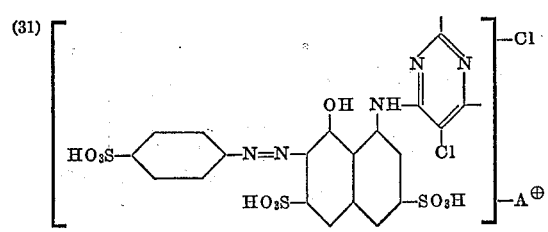
(37) 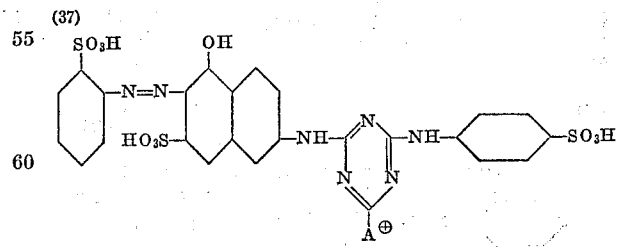
(38) 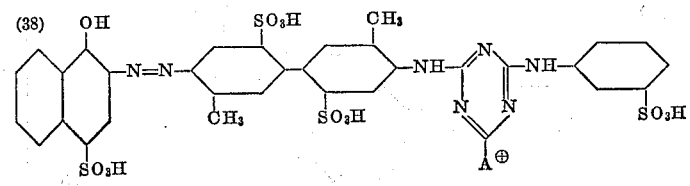

(39) 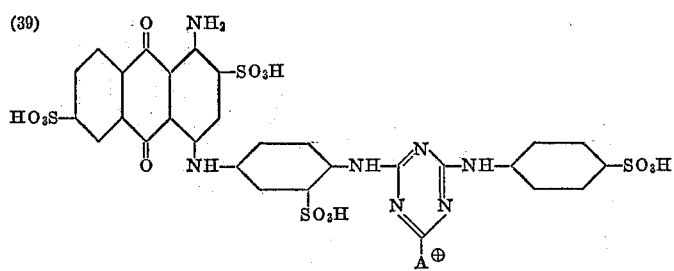
(40) 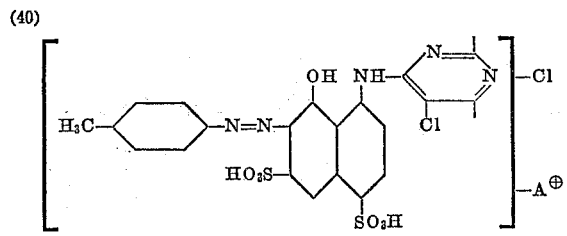
(41) 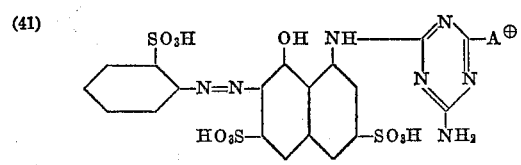
(42) 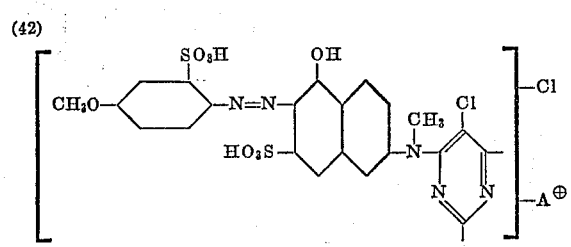
(43) 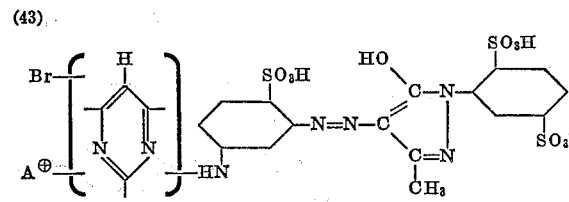
(44) 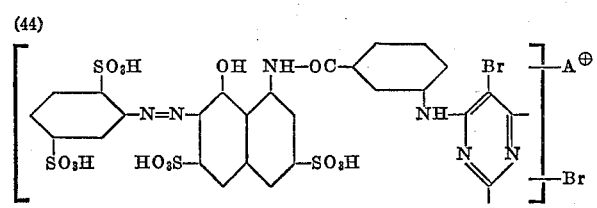
(45) 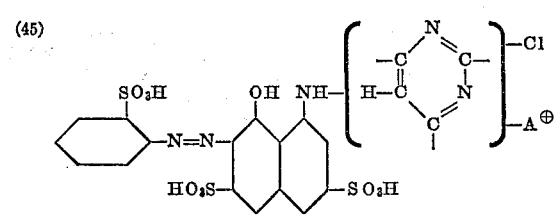
(46) 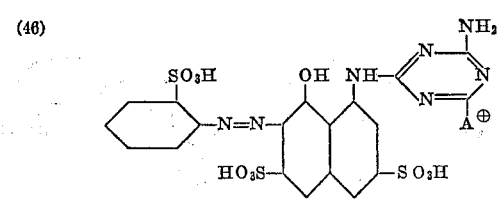
(47) 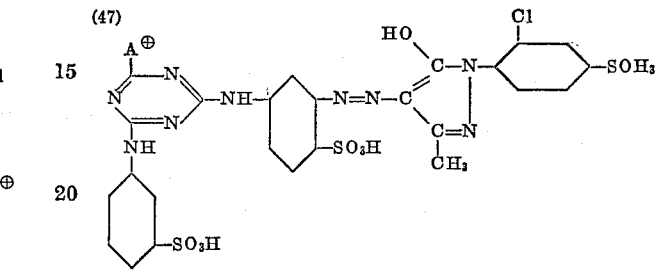
(48) 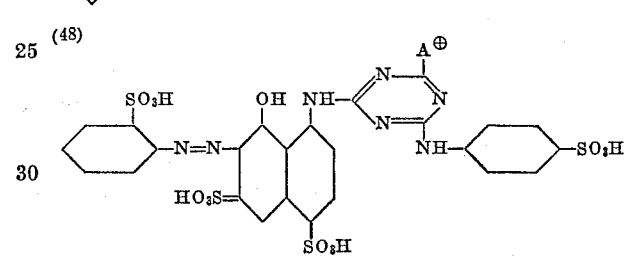
(49) 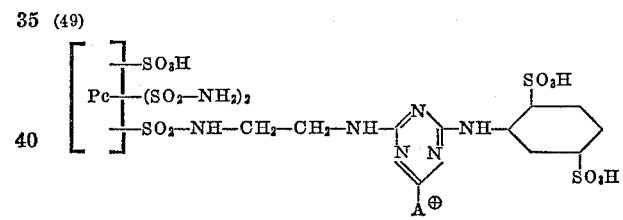
(50) 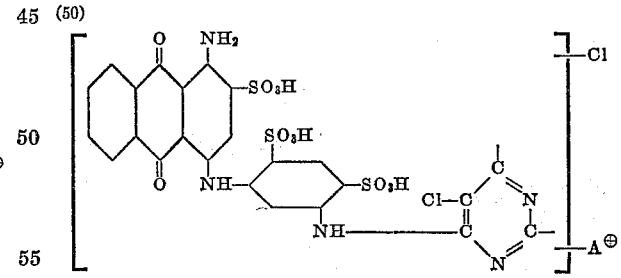
(51) 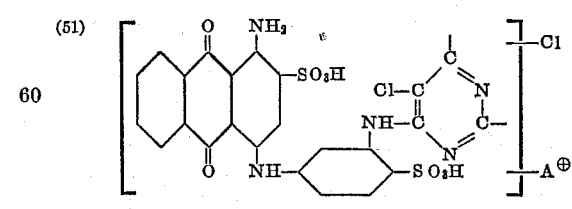
(52) 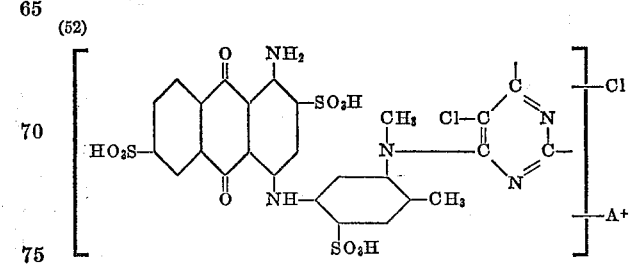

(53) 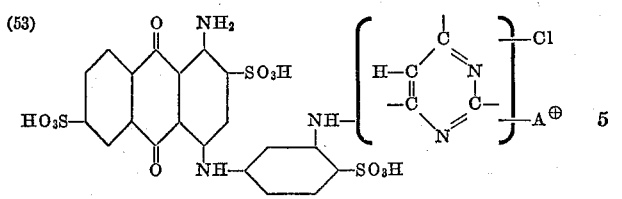

In the dyes listed in the precedent table A⊕ represents:
(1) The radical

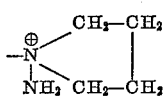

from N-aminopyrrolidine (Examples 1, 2, 3, 4, 6, 7, 9, 10, 11, 12, 14, 15, 18, 21, 22, 23, 28, 34, 37, 38, 39, 41, 42, 43, 44, 45, 46, 50, 51, 52, 53).

(2) The radical

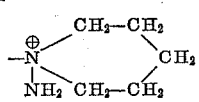

from N-aminopiperidine (Examples 8, 13, 30, 33, 47, 49).

(3) The radical

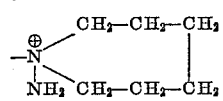

from N-amino-hexamethylene-imine (Examples 5, 16, 17, 19, 20, 24, 25, 26, 27, 29, 31, 32, 40).

(4) The radical

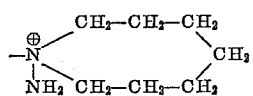

from N-aminoheptamethylene-imine (Examples 35, 36, 48).

The dyeings produced on cotton with dyes of the table are of the following shade.

| No.: | Shade |
|---|---|
| 1 | Blue |
| 2 | Yellow |
| 3 | Yellow |
| 4 | Orange |
| 5 | Blue-grey |
| 6 | Dark green |
| 7 | Violet |
| 8 | Violet |
| 9 | Reddish blue |
| 10 | Turquoise blue |
| 11 | Navy blue |
| 12 | Violet-brown |
| 13 | Yellow |
| 14 | Red |
| 15 | Dark green |
| 16 | Red |
| 17 | Reddish yellow |
| 18 | Orange |
| 19 | Red |
| 20 | Yellow |
| 21 | Ruby |
| 22 | Red |
| 23 | Yellow |
| 24 | Reddish yellow |
| 25 | Blue |
| 26 | Bluish red |
| 27 | Violet |
| 28 | Ruby |
| 29 | Ruby |
| 30 | Bluish red |
| 31 | Bluish red |
| 32 | Bluish red |
| 33 | Scarlet |
| 34 | Red |
| 35 | Orange |
| 35 after coppered | Ruby |
| 36 | Bluish red |
| 37 | Orange |
| 38 | Scarlet |
| 39 | Blue |
| 40 | Bluish red |
| 41 | Blue-red |
| 42 | Scarlet |
| 43 | Yellow |
| 44 | Red |
| 45 | Red |
| 46 | Red |
| 47 | Yellow |
| 48 | Red |
| 49 | Turquoise blue |
| 50 | Reddish blue |
| 51 | Reddish blue |
| 52 | Reddish blue |
| 53 | Blue |

Having thus disclosed the invention what we claim is:
1. A water-soluble dye of the formula

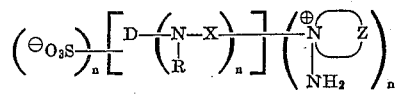

wherein
D represents the radical of a dye selected from the group consisting of
(A) an unmetallized monoazo dye bearing from 1 to 4 HO₃S— groups and selected from the group consisting of
(1) benzene-azo-naphthalene dyes,
(2) benzene-azo-5-pyrazolone dyes,
(3) naphthalene-azo-naphthalene dyes, and
(4) diphenyl-azo-naphthalene dyes;
(B) the 1:1-copper, 1:2-chromium and 1:2-cobalt complexes of the said unmetallized dyes;
(C) a disazo dye bearing from 2 to 4 HO₃S— groups and selected from the group consisting of
(1) benzene - azo - benzene-azo - naphthalene dyes, and
(2) benzene - azo - naphthalene - azo - benzene dyes;
(D) 1-amino-2-sulfo-4-arylamino - anthraquinone dyes bearing from 1 to 3 sulfonic acid groups and wherein aryl is from mononuclear to binuclear; and
(E) copper phthalocyanine sulfonic acid dyes containing from 2 to 3 water-solubilizing substituents selected from the group consisting of —SO₃H and —SO₂—NH₂,
R represents a member selected from the group consisting of hydrogen and lower alkyl,
X represents a member selected from the group consisting of a divalent radical of the pyrimidine series bearing one to two halogen atoms with an atomic weight between 35 and 81 bound to carbon atoms, a divalent radical of the symmetrical triazine series bearing a lower alkoxy radical, a divalent radical of the symmetrical triazine series bearing an unsubstituted amino group and a divalent radical of the symmetrical triazine series bearing a substituted amino group, the substituents of the amino group being chosen from the group consisting of methyl, phenyl, sulfophenyl and disulfophenyl,
Z represents a saturated aliphatic chain having 4 to 7 carbon atoms, and
n represents one of the integers 1 and 2,
and wherein the dye molecule beside n SO₃⊖ groups bears 1 to 4 additional water-solubilizing groups selected from the group consisting of —SO₃H and —SO₂—NH₂.

2. A water-soluble dye as defined in claim 1, wherein Z is

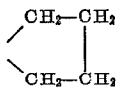

3. The water-soluble dye of the formula

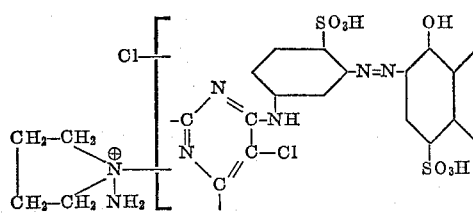

4. The water-soluble dye of the formula

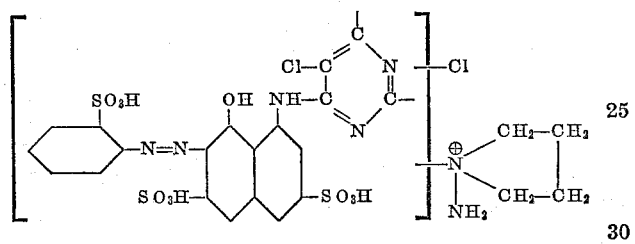

5. The water-soluble dye of the formula

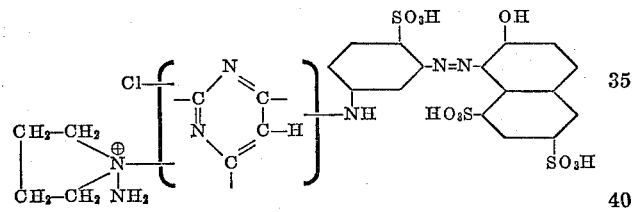

6. The water-soluble dye of the formula

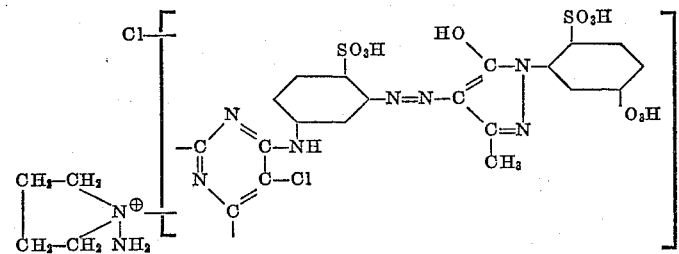

7. The water-soluble dye of the formula

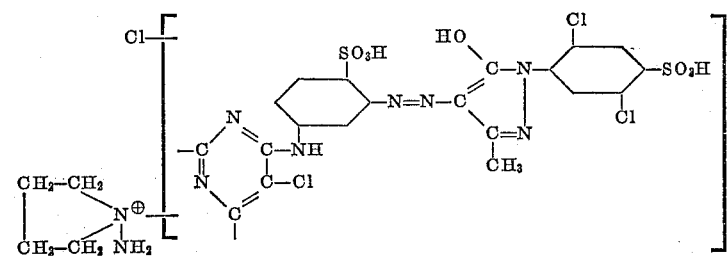

8. The water-soluble dye of the formula

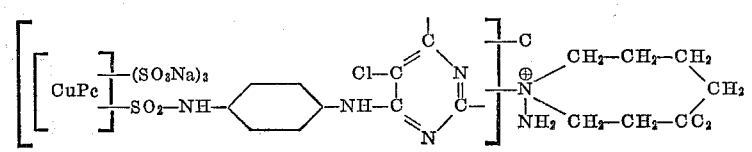

9. The water-soluble dye of the formula

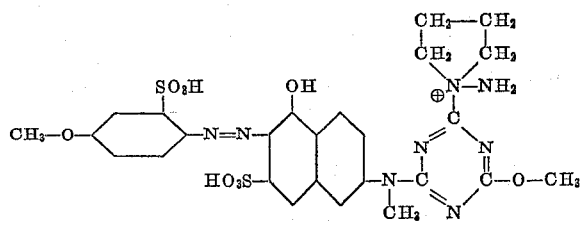

10. The water-soluble dye of the formula

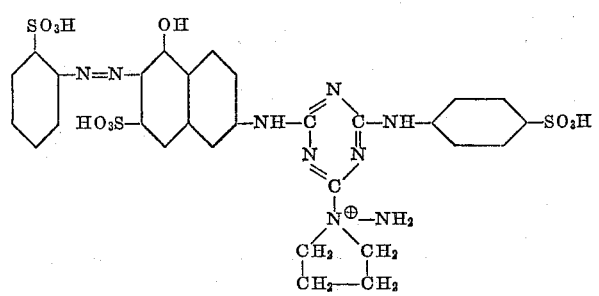

11. The water-soluble dye of the formula

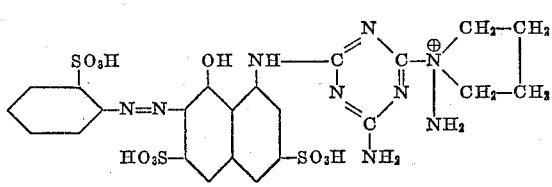

12. The water-soluble dye of the formula
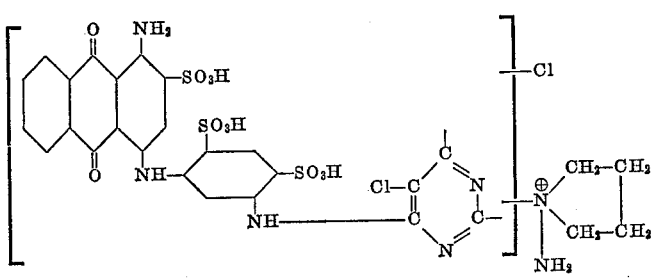
No references cited.
CHARLES B. PARKER, *Primary Examiner.*